(12) United States Patent
Kawano et al.

(10) Patent No.: US 6,653,753 B1
(45) Date of Patent: Nov. 25, 2003

(54) LINEAR MOTOR

(75) Inventors: Shinichiro Kawano, Osaka (JP); Yukio Honda, Osaka (JP); Hiroshi Murakami, Osaka (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/719,663

(22) PCT Filed: Apr. 12, 2000

(86) PCT No.: PCT/JP00/02382

§ 371 (c)(1),
(2), (4) Date: May 18, 2001

(87) PCT Pub. No.: WO00/62406

PCT Pub. Date: Oct. 19, 2000

(30) Foreign Application Priority Data

Apr. 13, 1999 (JP) .......................... 11/105161
Apr. 13, 1999 (JP) .......................... 11/105162

(51) Int. Cl.[7] .............................................. H02K 41/00
(52) U.S. Cl. .......................................... 310/14; 310/12
(58) Field of Search ........................ 310/12–15, 17, 310/28, 30, 31, 34, 35

(56) References Cited

U.S. PATENT DOCUMENTS

| | | | | | |
|---|---|---|---|---|---|
| 3,421,033 | A | * | 1/1969 | Hoffmeyer | 310/172 |
| 3,922,501 | A | * | 11/1975 | Yamamuro | 381/414 |
| 3,993,972 | A | * | 11/1976 | Barbrook | 335/220 |
| 4,283,647 | A | * | 8/1981 | Herr et al. | 310/154.22 |
| 4,349,757 | A | * | 9/1982 | Bhate | 310/15 |
| 4,429,240 | A | * | 1/1984 | Kishi | 310/45 |
| 4,700,093 | A | * | 10/1987 | Negishi | 310/89 |
| 4,757,220 | A | * | 7/1988 | Pouillange | 310/49 R |
| 4,990,806 | A | * | 2/1991 | Kikuchi et al. | 310/49 A |
| 5,357,587 | A | * | 10/1994 | Grodinsky | 381/414 |
| 5,440,183 | A | * | 8/1995 | Denne | 310/12 |
| 5,537,482 | A | * | 7/1996 | Janning | 381/198 |
| 5,710,474 | A | * | 1/1998 | Mulgrave | 310/254 |
| 5,734,209 | A | * | 3/1998 | Hallidy | 310/12 |
| 5,808,381 | A | * | 9/1998 | Aoyama et al. | 310/12 |
| 6,060,810 | A | * | 5/2000 | Lee et al. | 310/254 |
| 6,097,125 | A | * | 8/2000 | Park et al. | 310/156 |
| 6,177,748 | B1 | * | 1/2001 | Katcher et al. | 310/209 |
| 6,191,517 | B1 | * | 2/2001 | Radovsky | 310/162 |
| 6,222,286 | B1 | * | 4/2001 | Watanabe et al. | 310/49 R |
| 6,251,514 | B1 | * | 6/2001 | Lashmore et al. | 428/328 |
| 6,452,302 | B1 | * | 9/2002 | Tajima et al. | 310/216 |

FOREIGN PATENT DOCUMENTS

| | | |
|---|---|---|
| JP | 2-57277 | 4/1990 |
| JP | 3-235651 A | 10/1991 |
| JP | 6-303755 A | 10/1994 |
| JP | 10-285898 A | 10/1998 |
| JP | 10-512437 A | 11/1998 |
| JP | 10-323003 A | 12/1998 |
| JP | 11-187639 A | 7/1999 |
| JP | 11-220846 | * 8/1999 |
| WO | WO 97/13261 | 4/1997 |

* cited by examiner

*Primary Examiner*—Nestor Ramirez
*Assistant Examiner*—Judson H. Jones
(74) *Attorney, Agent, or Firm*—Rossi & Associates

(57) ABSTRACT

A linear motor includes tubular outer yoke (4), tubular inner yoke (3) disposed in outer yoke (4), coil (2) provided to inner yoke (3), permanent magnet (5a, 5b) vibrating following a magnetic flux produced by coil (2), and vibrator (6) made of magnetic material and supporting permanent magnets (5a, 5b). Magnetic loop produced by outer yoke (4) and inner yoke (3) travels through vibrator (6) free from interference by vibrator (6) because vibrator (6) is made of magnetic material. As a result, the linear motor vibrates efficiently.

2 Claims, 18 Drawing Sheets

LINEAR MOTOR

TECHNICAL FIELD

The present invention relates to a linear motor performing linear motion.

BACKGROUND ART

FIG. 19 illustrates a conventional linear motor. Tubular outer yoke 201 houses tubular inner yoke 203 having coil 202. Permanent magnet 204 is disposed between outer yoke 201 and inner yoke 203. Magnet 204 vibrates following the magnetic flux generated by inner yoke 203, so that a vibrator—fixing magnet 204—reciprocates.

The linear motor discussed above; however, has the following problems:

(1) The permanent magnet is fixed to the vibrator on its outer yoke side. The vibrator is thus positioned between the inner yoke having the coil and the permanent magnet. Thus a space between the inner yoke and the magnet becomes too wide. As a result, magnetic-flux-path incurs some loss. Further, the magnetic flux generated by the inner yoke changes greatly, so that eddy current is produced at a vibrator facing the inner yoke.

(2) The vibrator supporting the permanent magnet is non-magnetic body, thus when the vibrator is placed between the magnet and the yoke, non-magnetic-section other than the space is produced. This structure allows the non-magnetic-section to interfere with magnetic-flux for generating vibration, thus the vibrator cannot vibrate efficiently.

(3) Both the inner and outer yokes are formed by laminating electromagnetic steel in the circumferential direction, therefore, manufacturing them is a cumbersome work.

The objective of the present invention is to provide a linear motor, where a space between the permanent magnet and the inner yoke is provided as narrow as possible, the production of eddy current is thus restrained, and the yoke is easy to manufacture.

SUMMARY OF THE INVENTION

The linear motor of the present invention comprises the following elements:

(a) a tubular outer yoke;
(b) a tubular inner yoke disposed in the outer yoke;
(c) a coil provided to the outer yoke or the inner yoke;
(d) a permanent magnet vibrating between the outer and inner yokes following the magnetic flux generated by the coil; and
(e) a vibrator supporting the permanent magnet and made of magnetic material.

The magnetic-flux-loops produced by the outer and inner yokes travel through the vibrator without being hindered by the vibrator. As a result, the linear motor can vibrate efficiently.

Further, in the linear motor of the present invention, the permanent magnet is fixed to the vibrator on its coil side, so that the magnet is placed closer to the yoke on the coil side.

Still further, the linear motor of the present invention includes a plurality of coils in the inner yoke or outer yoke, and a plurality of permanent magnets on the side opposite to the coils of the vibrator. The plurality of permanent magnets arranged in the vibrator's vibrating direction have unlike polarities adjacently. The vibrator has slits between adjacent magnets, so that leakage flux produced between unlike adjacent polarities can be prevented.

When the electrical resistance of the vibrator of the present invention is not less than $100\,\mu\Omega.\mathrm{cm}$, the production of eddy current can be restrained.

The permeability of the vibrator of the present invention is preferably more than ten times of vacuum permeability.

The vibrator is preferably made of the material mainly comprising iron and chrome.

The vibrator is preferably made of the material including 80–90 wt % of iron and 10–20 wt % of chrome.

The vibrator is preferably made of the material mainly comprising iron, chrome and aluminum.

The vibrator is preferably made of the material including 75–88 wt % of iron, 10–20 wt % of chrome and 2–5 wt % of aluminum.

The vibrator is preferably made of the material mainly comprising iron and silicon.

The vibrator is preferably made of the material mainly comprising nickel and iron.

At least one slit is provided on a side of the vibrator, so that the production of eddy current is restrained. This slit may be long and narrow in the vibrator's vibrating direction.

At least one electrically insulated section made of resin is provided on a side of the vibrator, so that the production of eddy current is restrained.

A compressor of the present invention comprises the following elements:

a linear motor including:
  a tubular outer yoke;
  a tubular inner yoke disposed in the outer yoke;
  a coil provided to the outer yoke or the inner yoke;
  a permanent magnet vibrating between the outer and inner yokes following the magnetic flux generated by the coil; and
a vibrator supporting the permanent magnet and made of magnetic material.

The compressor can be driven efficiently.

The linear motor of the present invention comprises the following elements:

(a) a tubular outer yoke;
(b) a tubular inner yoke disposed in the outer yoke;
(c) a coil provided to the outer yoke or the inner yoke;
(d) a permanent magnet vibrating between the outer and inner yokes following the magnetic flux generated by the coil; and
(e) a vibrator supporting the permanent magnet.

The permanent magnet is fixed to the outer yoke or inner yoke whichever includes the coil. This structure allows the permanent magnet to be placed closer to the yoke having the coil.

The compressor of the present invention comprises the following elements:

a linear motor including:
  a tubular outer yoke;
  a tubular inner yoke disposed in the outer yoke;
  a coil provided to the outer yoke or the inner yoke;
  a permanent magnet vibrating between the outer and inner yokes following the magnetic flux generated by the coil; and
  a vibrator supporting the permanent magnet.

The permanent magnet is fixed to the outer yoke or inner yoke whichever includes the coil. This structure allows the compressor to be driven efficiently.

The linear motor of the present invention comprises the following elements:

(a) a yoke formed of compression-formed body made of metal magnetic particles;
(b) a mover vibrating along the yoke.

This structure allows the linear motor to be manufactured with ease.

The linear motor of the present invention may comprise the following elements:
(a) a tubular outer yoke;
(b) a tubular inner yoke disposed in the outer yoke;
(c) a coil provided to the outer yoke or the inner yoke;
(d) a permanent magnet vibrating between the outer and inner yokes following the magnetic flux generated by the coil; and
(e) a vibrator supporting the permanent magnet.

At least one of the outer yoke or inner yoke may be formed by compression-formed body made of metal magnetic particles.

The yoke of the compressed and molded body of the present invention may be made of metal magnetic particles and electrically insulated resin.

The yoke of the linear motor of the present invention may be a compression-formed body made of metal magnetic particles having an insulated layer on its surface.

The yoke of the linear motor of the present invention is formed by metal magnetic particles and its surface electrically insulated may be made of inorganic material.

The yoke of the linear motor of the present invention is divided in the cirumferential direction, so that the production of eddy current is restrained.

The yoke of the linear motor of the present invention is divided in the circumferential direction and an insulating layer is provided to the bonding face of the yoke. This structure allows the motor to further restrain the production of eddy current.

The compressor of the present invention comprises a linear motor including a yoke formed of a compression-formed body made of metal magnetic particles and a mover moving along the yoke.

The linear motor of the present invention comprises the following elements:
(a) a tubular outer yoke;
(b) a tubular inner yoke disposed in the outer yoke;
(c) a coil provided to the outer yoke or the inner yoke;
(d) a permanent magnet vibrating between the outer and inner yokes following the magnetic flux generated by the coil; and
(e) a vibrator supporting the permanent magnet.

At least one of the outer yoke or inner yoke is formed by arranging a plurality of laminated blocks in an annular shape, and a space between the adjacent blocks is formed by the compression-formed body.

The compressor of the present invention comprises the following elements:
a linear motor including:
(a) a tubular outer yoke;
(b) a tubular inner yoke disposed in the outer yoke;
(c) a coil provided to the outer yoke or the inner yoke;
(d) a permanent magnet vibrating between the outer and inner yokes following the magnetic flux generated by the coil; and
(e) a vibrator supporting the permanent magnet.

At least one of the outer yoke or inner yoke is formed by arranging a plurality of laminated blocks in an annular shape, and a space between the adjacent blocks is formed by the compression-formed body.

BEST MODE FOR CARRYING OUT THE PRESENT INVENTION (Exemplary Embodiment 1)

Figure 1A:
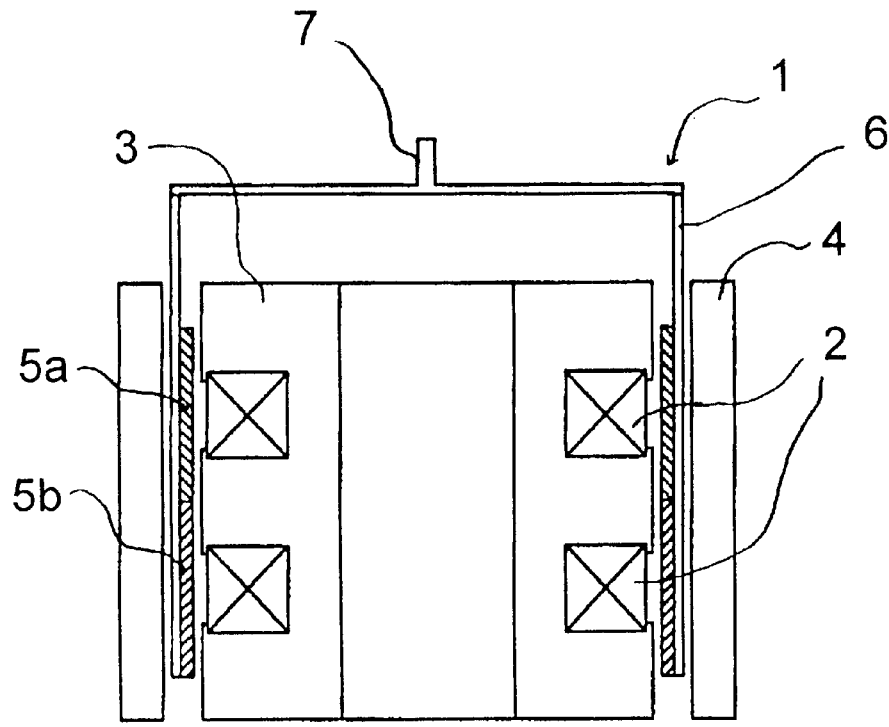
FIG. 1(a) and FIG. 1(b) are a cross section and a plan view of a linear motor in accordance with a first exemplary embodiment.
Figure 1B:
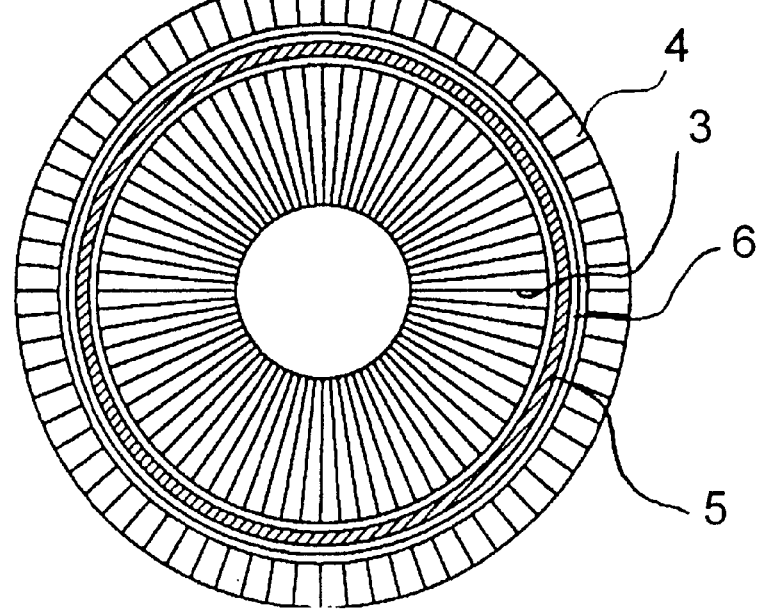

FIG. 1 shows a construction of a linear motor. Linear motor 1 comprises the following elements:
(a) tubular inner yoke 3;
(b) coils 2 formed by windings wound on inner yoke 3;
(c) outer yoke 4 in which inner yoke 3 is disposed;
(d) permanent magnets 5a, 5b situated in a space between inner yoke 3 and outer yoke 4, and vibrating following the magnetic flux generated by coils 2; and
(e) tubular vibrator 6 supporting magnets 5a, 5b.

Magnets 5a, 5b are fixed to a side face of vibrator 6 on the side of inner yoke 4. Output section 7, for supplying the vibration of vibrator 6 to outside, is disposed at an end of vibrator 6. Output section 7 shapes in a lid closing tubular vibrator 6. A resonance spring is disposed on an output shaft of output section 7. Utilizing the resonance of the spring saves some force necessary for vibration, and also saves some driving current running through coils 2.

Next, this linear motor is detailed. Inner yoke 3 is formed by laminating magnetic and rectangular steel sheets having two recesses in circumferential direction, and forms a tubular shape. Successive recesses form ring-shaped grooves on the outer wall of inner yoke 3. Windings wound on these ring-shaped grooves form coils 2.

Outer yoke 4 is formed by laminating magnetic and rectangular sheets in circumferential direction, and forms a tubular shape. Inner yoke 3 is disposed in outer yoke 4. The inner wall of outer yoke 4 is parallel to the outer wall of inner yoke 3, and there is an even clearance therebetween.

Ring-shaped permanent magnets 5a, 5b are bonded or press-fitted to the inner wall of vibrator 6. The magnetic fluxes of magnets 5a, 5b are directed in radial direction of inner yoke 3, and adjacent magnets 5a, 5b have unlike polarities. The magnet flux of magnet 5a travels from inner yoke 3 to outer yoke 4, while that of magnet 5b travels from outer yoke 4 to inner yoke 3.

The structure discussed above allows the linear motor to vibrate vibrator 6 by switching the current of coils 2. When current runs through coils 2, outer yoke 4 and inner yoke 3 form magnetic-flux-loops. These loops cause magnetic fluxes to appear at the space, and permanent magnet 5 moves to approach the magnetic fluxes. Switching the direction of current reverses the magnetic fluxes traveling through the space. As such, switching the current-direction vibrates the vibrator.

A first feature of this first embodiment is that magnet 5a, 5b are fixed to the vibrator 6 on its inner yoke side, and the linear motor can be assembled by using magnets 5a, 5b in a state of being close to inner yoke 3.

Figure 2A:
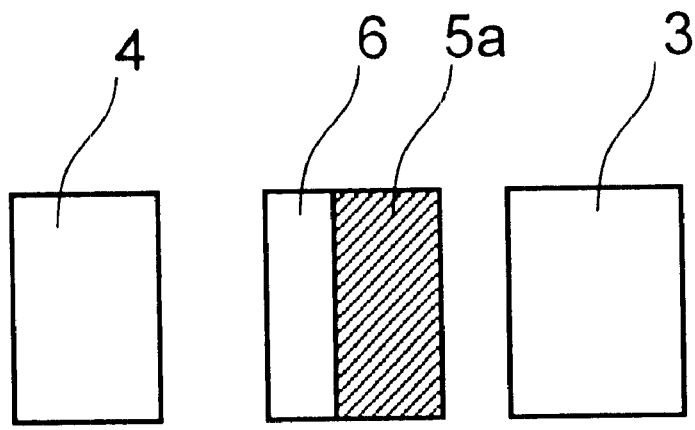
FIG. 2(a) is a partial cross section of the linear motor in accordance with the first embodiment.
Figure 2B:
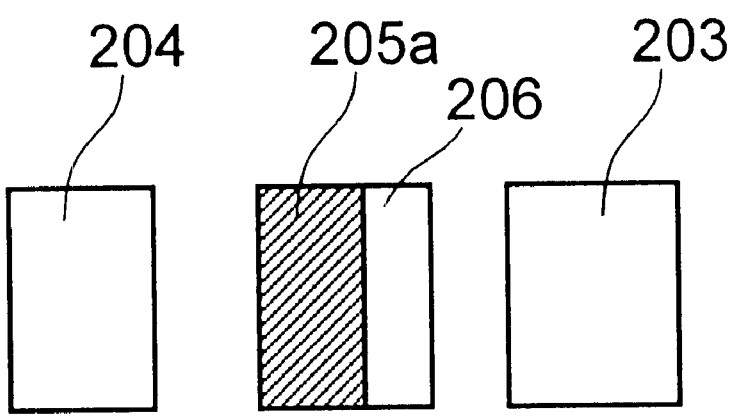
FIG. 2(b) is a partial cross section of a conventional linear motor.

FIG. 2(a) is a partial cross section of the linear motor in accordance with the first embodiment, and FIG. 2(b) is a partial cross section of a conventional linear motor.

Magnetic-flux for generating vibration is produced in inner yoke 3, therefore, permanent magnet 5, corresponding to the magnetic-fluxes, is preferably placed as close as possible to inner yoke 3. In this embodiment, magnet 5 is fixed to vibrator 6 on its inner yoke side. Therefore between magnets 5a, 5b and the inner yoke, there is nothing but a space. Thus magnets 5a, 5b can be placed as close as possible to inner yoke 3 including coils 2.

FIG. 2(b) shows that permanent magnet 205, as disclosed in Japanese Examined Patent H06-91727, is fixed to vibrator 206 on its yoke 204 side. The vibrator of the conventional linear motor is made of non-magnetic material. As such, magnet 205 is fixed to vibrator 206, and between inner yoke 203 having a coils and permanent magnet 205, there are a space and vibrator 206. Thus the space between magnet 205 and inner yoke 203 is greater than that shown in FIG. 2(a) by the thickness of vibrator 206. In other words, the conventional magnetic flux produced in inner yoke 203 and affecting magnet 205 is smaller than that in the first embodiment.

In this embodiment, permanent magnet 5 is fixed to vibrator 6 on its inner yoke side 3. This structure allows the motor of the present invention to use magnetic-fluxes for generating vibration produced by the inner yoke more efficiently than the conventional motor. This structure also allows the vibrator to be placed more distantly from the inner yoke, which produces the magnetic-fluxes for generating vibration, than the conventional case, thereby restraining the production of eddy current.

The vibrator of the first embodiment is made of magnetic material; however, the vibrator may be made of non-magnetic material with the same advantage.

A second feature of the first embodiment is that vibrator 6 which fixes magnets 5a, 5b has magnetism. Since the conventional vibrator is made of non-magnetic material, which hinders the magnetic fluxes of the magnetic loops formed between inner yoke 3 and outer yoke 4. However, vibrator 6, in this embodiment, is made of magnetic material and does not hinder the magnetic loops produced between inner yoke 3 and outer yoke 4. In other words, because vibrator 6 is made of magnetic material, non-magnetic distance between outer yoke 4 and inner yoke 3 can be practically shortened.

Magnets 5a, 5b are fixed to vibrator 6 on its inner yoke 3 side, so that vibrator 6 can be utilized as a back yoke of magnets 5a, 5b. A plurality of permanent magnets 5a, 5b are fixed to a common vibrator, and magnets 5a, 5b are magnetically coupled with each other by vibrator 6. In other words, vibrator 6 functions as the back yoke and thus uses the greater magnetic fluxes of magnets 5a, 5b.

Vibrator 6 has magnetism and comprises iron, chrome and aluminum. It also includes silicon not more than 3 wt % for adjusting its resistance value. To be more specific about ingredients, the material includes 75–88 wt % of iron, 10–20 wt % of chrome, and 2–5 wt % of aluminum. Vibrator's permeability is more than 10 times as much as that of vacuum.

This structure discussed above allows outer yoke 4 and inner yoke 3 to be spaced with a shorter magnetic gap, and thus they reciprocate efficiently.

Further, vibrator 6 is placed between outer yoke 4 and permanent magnets 5a, 5b, so that vibrator 6 is utilized as the back yoke.

(Exemplary Embodiment 2)

Figure 3A:
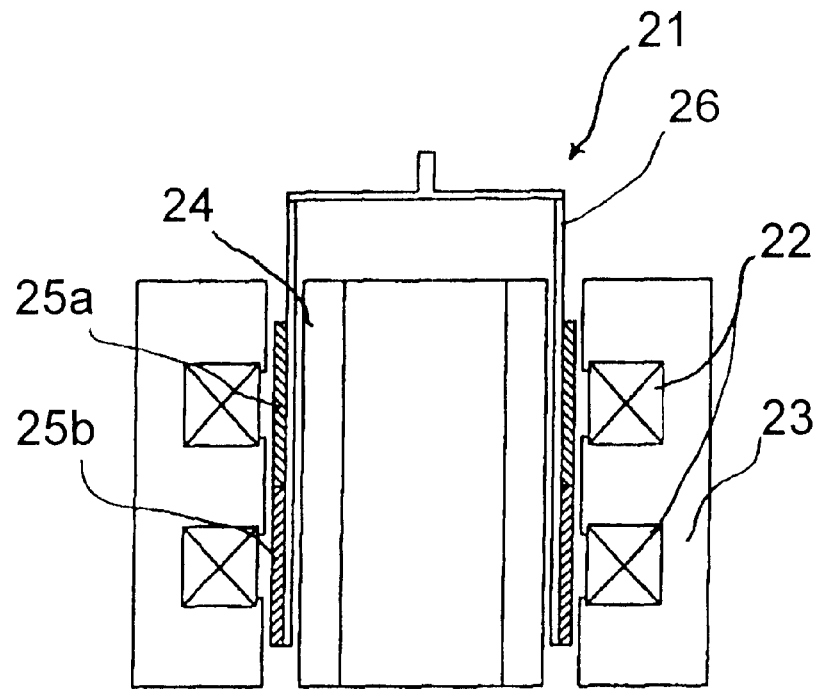
FIG. 3(a) and FIG. 3(b) are a cross section and a plan view of a linear motor in accordance with a second exemplary embodiment.
Figure 3B:
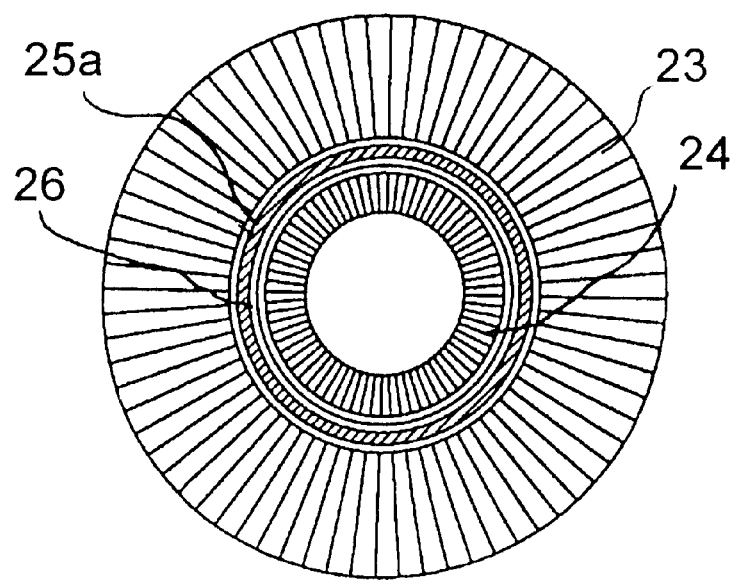

Linear motor 21 shown in FIG. 3 comprises the following elements:

(a) tubular outer yoke 23 having coils 22 where windings are coiled;

(b) tubular inner yoke 24 disposed inside the outer yoke;

(c) permanent magnets 25a, 25b placed in a space between outer and inner yokes 23, 24 and vibrating following the magnetic fluxes generated by coils 22; and (d) vibrator 26 supporting and fixing the permanent magnets 25a, 25b. vibrator 26, fixing magnets 25a, 25b, is placed between magnets 25a, 25b and inner yoke 24, and has magnetism. Inner yoke 24 and outer yoke 23 are made by laminating electromagnetic steel sheets in circumferential direction.

The structure discussed above allows the space between outer yoke 23 and inner yoke 24 to be magnetically shortened and thus they reciprocate efficiently. Further, vibrator 26 is placed between inner yoke 24 and permanent magnets 25a, 25b, so that vibrator 26 is utilized as a back yoke.

Figure 18:
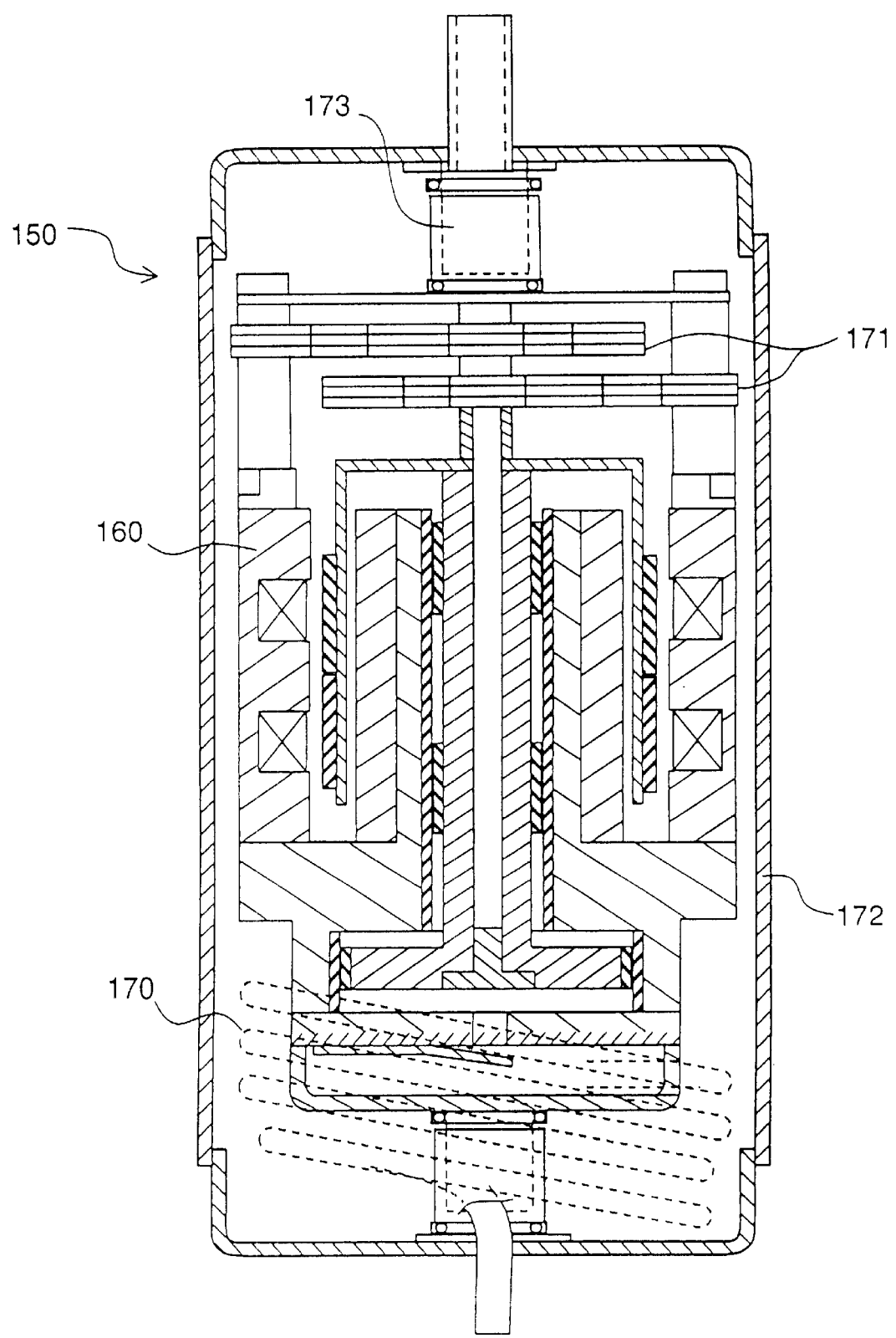
FIG. 18 is a cross section of a linear motor compressor.
Figure 19:
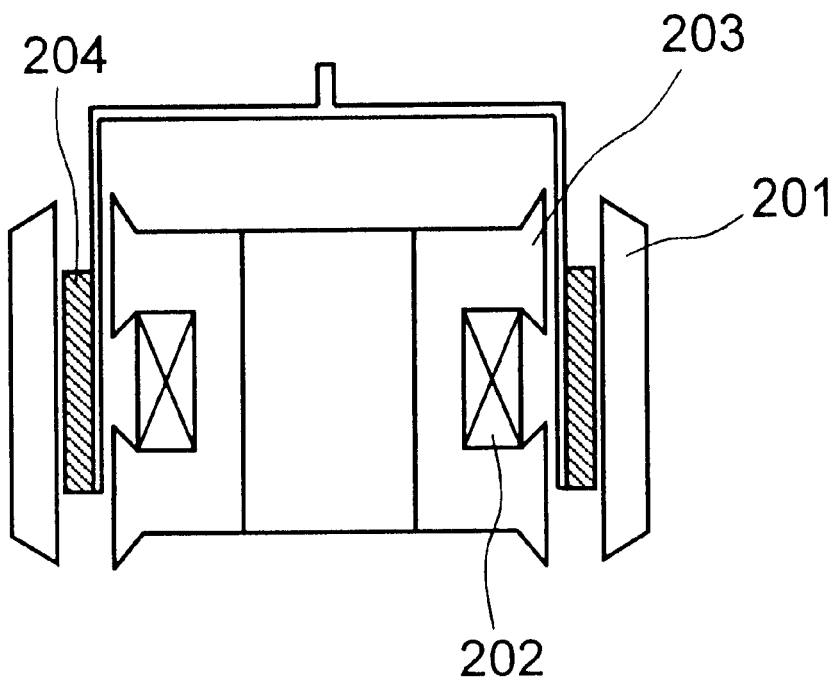
FIG. 19 is a cross section of a conventional linear motor.

As shown in FIG. 18, when the linear motor in accordance with the second embodiment is incorporated into a compressor, highly efficient driving can be expected. Linear compressor 150 comprises linear motor 160, discharge mechanism 170, spring mechanism 171, sealed container 172 and supporting mechanism 173.

(Exemplary Embodiment 3)

Figure 4A:
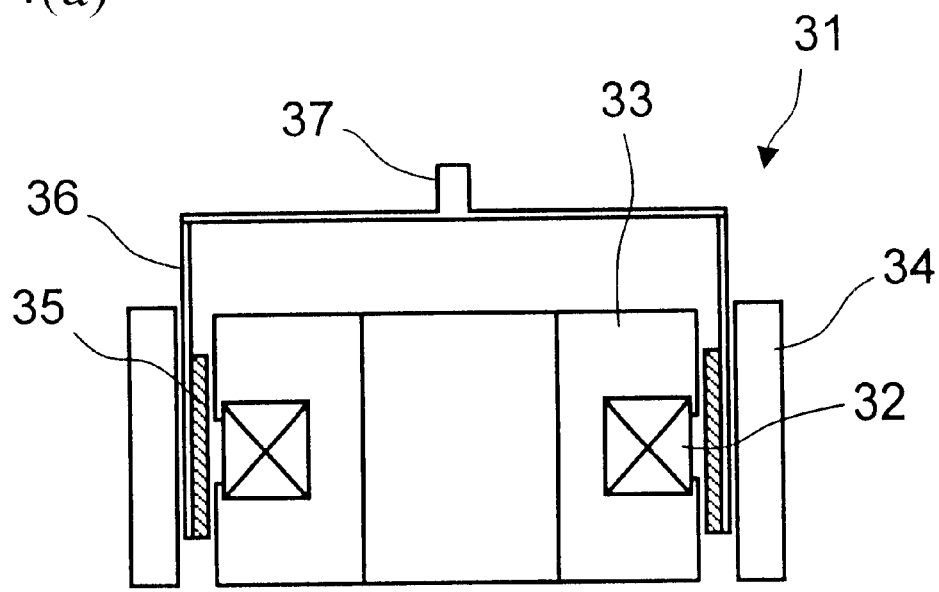
FIG. 4(a) and FIG. 4(b) are a cross section and a plan view of a linear motor in accordance with a third exemplary embodiment.
Figure 4B:
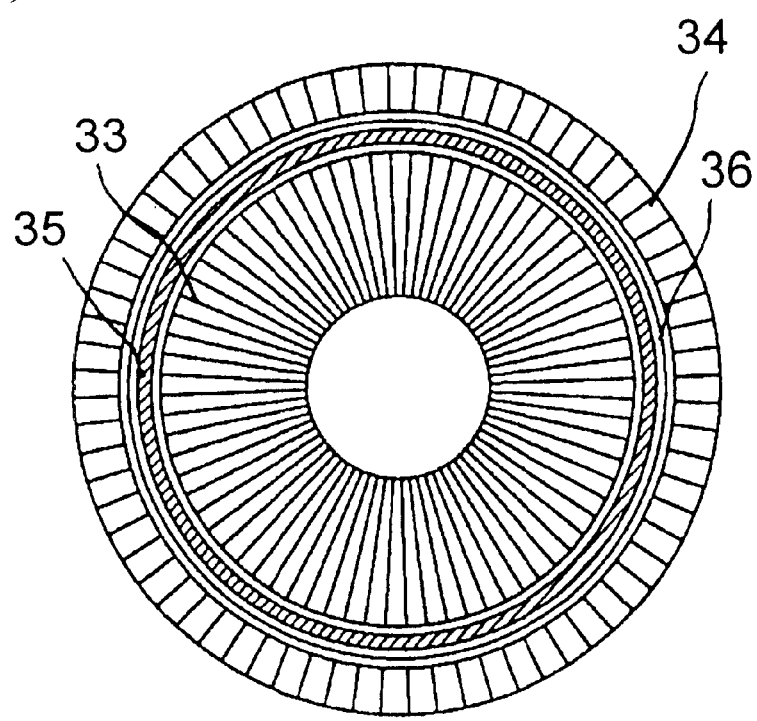

FIG. 4 shows a construction of linear motor 31, which comprises the following elements:

(a) tubular inner yoke 33;

(b) coil 32 of which windings are coiled on inner yoke 33;

(c) outer yoke 34 having inner yoke 33 therein;

(d) permanent magnet 35 disposed in a space between inner yoke 33 and outer yoke 34, and vibrating following the magnetic flux produced by coil 32; and (e) tubular vibrator 36 supporting magnet 35.

Permanent magnet 35 is fixed to vibrator 36 on its inner yoke 33 side. On one end of vibrator 36, there is output section 37 for supplying the vibration of vibrator 36 to outside. Output section 37 shapes in as if it closes tubular vibrator 36.

This linear motor is detailed hereinafter. Tubular inner yoke 33 is made by laminating rectangular electromagnetic steel sheets having a recess in circumferential direction. The successive recess forms a ring-shaped groove on outside of inner yoke 33. Winding wires on this groove forms coil 32.

The structure discussed above magnetically shortens the space between outer yoke 34 and inner yoke 33 even if linear motor 31 includes only one coil 32. Thus efficient reciprocating motion can be expected. Further, vibrator 36 is placed between outer yoke 34 and permanent magnets 35, so that vibrator 36 is utilized as a back yoke.

Figure 5:
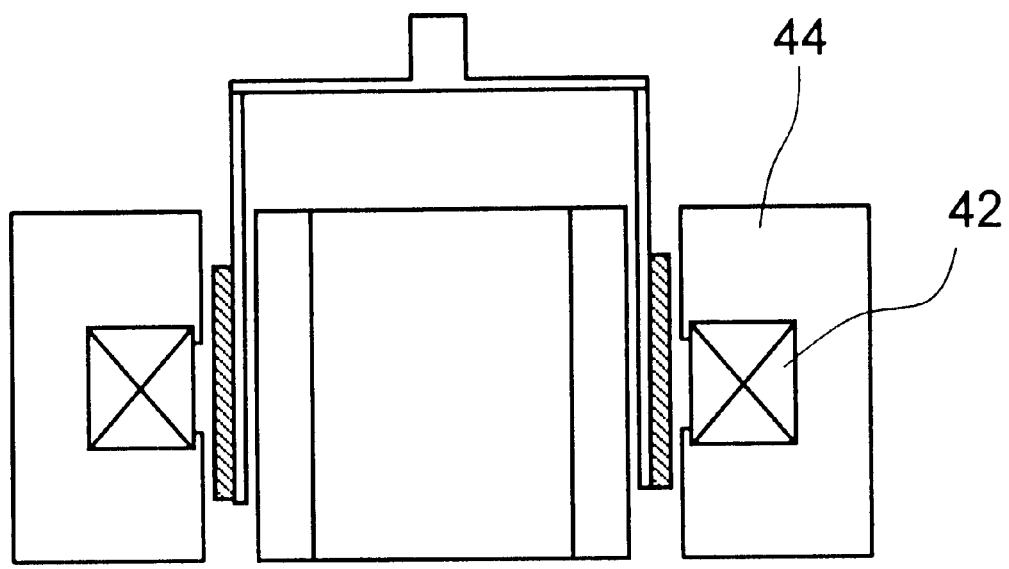
FIG. 5 is a cross section of another linear motor in accordance with the third embodiment.

As shown in FIG. 5, even one coil 42 placed on outer yoke 44 would produce the same advantage.

(Exemplary Embodiment 4)

Figure 6A:
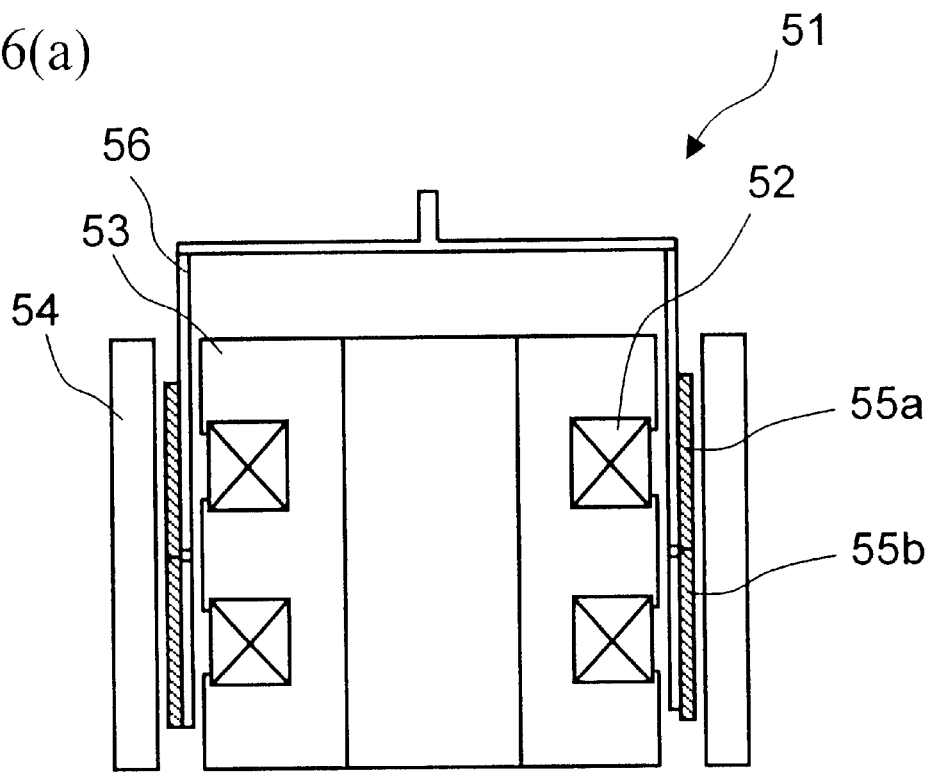
FIG. 6(a) and FIG. 6(b) are a cross section and a plan view of a linear motor in accordance with a fourth exemplary embodiment.
Figure 6B:
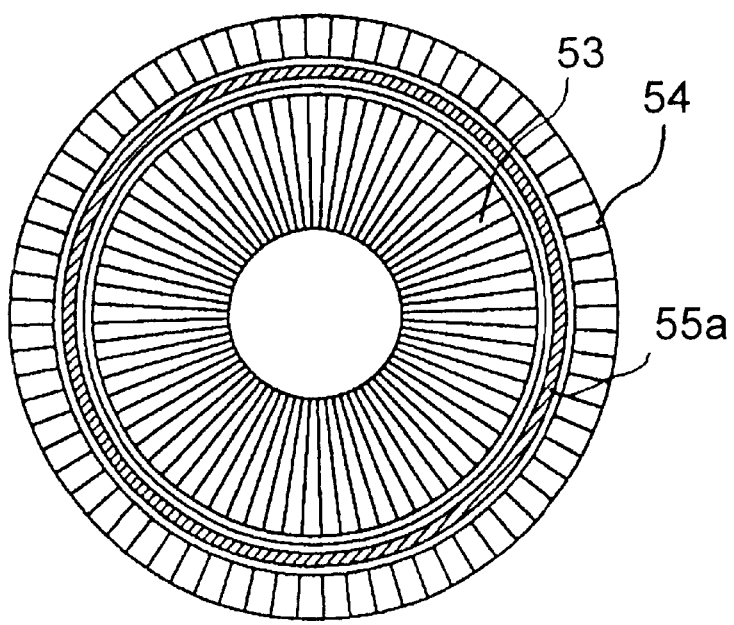

Linear motor 51 shown in FIG. 6 comprises the following elements:

(a) tubular inner yoke 53 having coils 52 where wires are wound;

(b) outer yoke 54 inside which inner yoke 53 is placed;

(c) ring-shaped permanent magnets 55a, 55b vibrating within a space between inner yoke 53 and outer yoke 54 following the magnetic fluxes produced by coils 52; and (d) vibrator 56 supporting magnets 55a, 55b and is made of magnetic material.

Figure 7A:
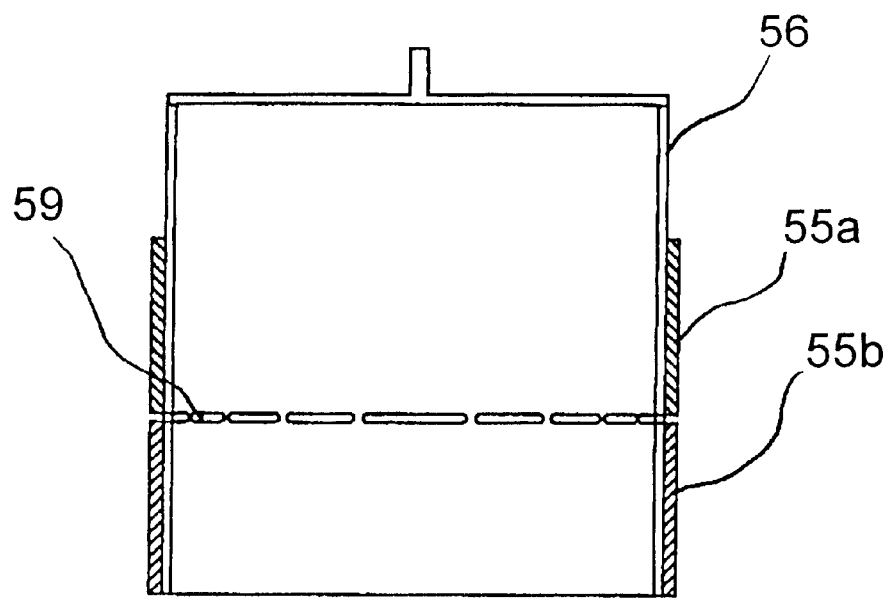
FIG. 7(a) and FIG. 7(b) are a cross section and a plan view of a vibrator in accordance with a fourth exemplary embodiment.
Figure 7B:
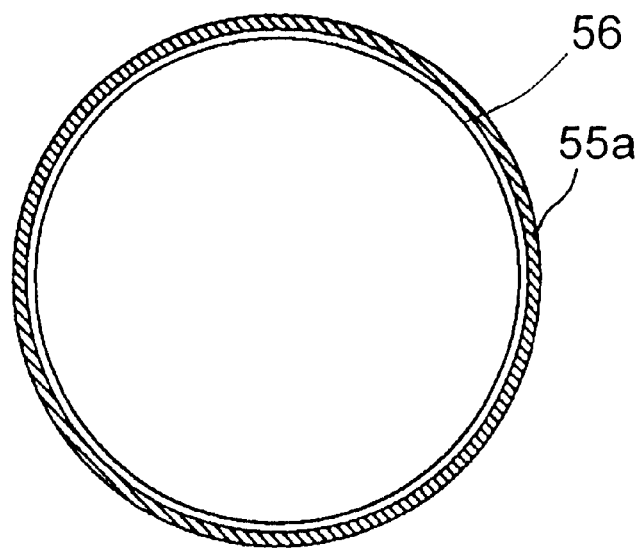

A feature of this fourth embodiment is that vibrator 56 has slit 59 between magnets 55a and 55b as FIG. 7 shows. Slit 59 is formed extendedly along the circumference direction of vibrator 56.

The magnetic fluxes produced by inner yoke 53 forms, via vibrator 56, magnetic loops between outer yoke 54 and inner yoke 53. Vibrator 56 is situated between magnets 55a, 55b and inner yoke 53; however since vibrator 56 is made of magnetic material, the thickness of vibrator 56 is not included in magnetic distance. This structure, i.e. permanent magnets 55a, 55b are fixed on outer wall of vibrator 56, makes the manufacturing with ease because permanent magnets can be mounted to the vibrator on its outer wall.

If magnets 55a, 55b are only pasted to vibrator 56, leakage flux is produced between magnets 55a and 55b using vibrator 56 as a magnetic-flux-path. Therefore, as shown in FIG. 7, slits 59 are provided between magnets 55a and 55b in order to reduce the leakage flux.

(Exemplary Embodiment 5)

Figure 8:
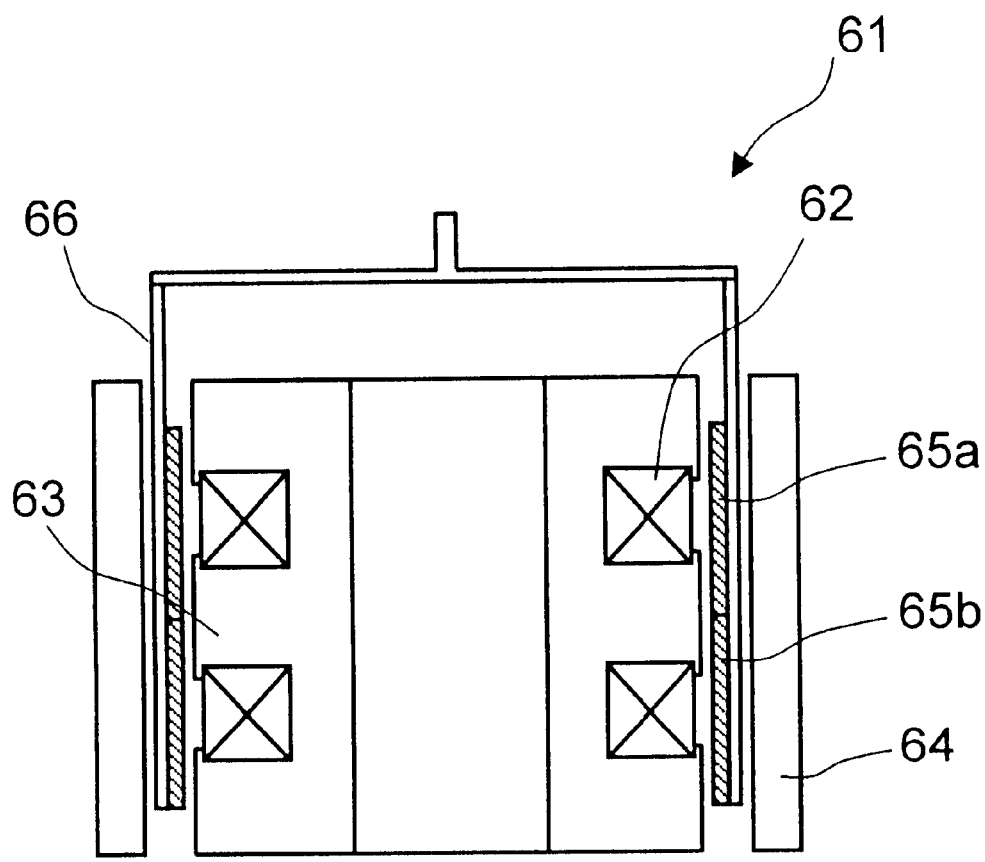
FIG. 8 is a cross section of a linear motor in accordance with a fifth exemplary embodiment.
Figure 9:
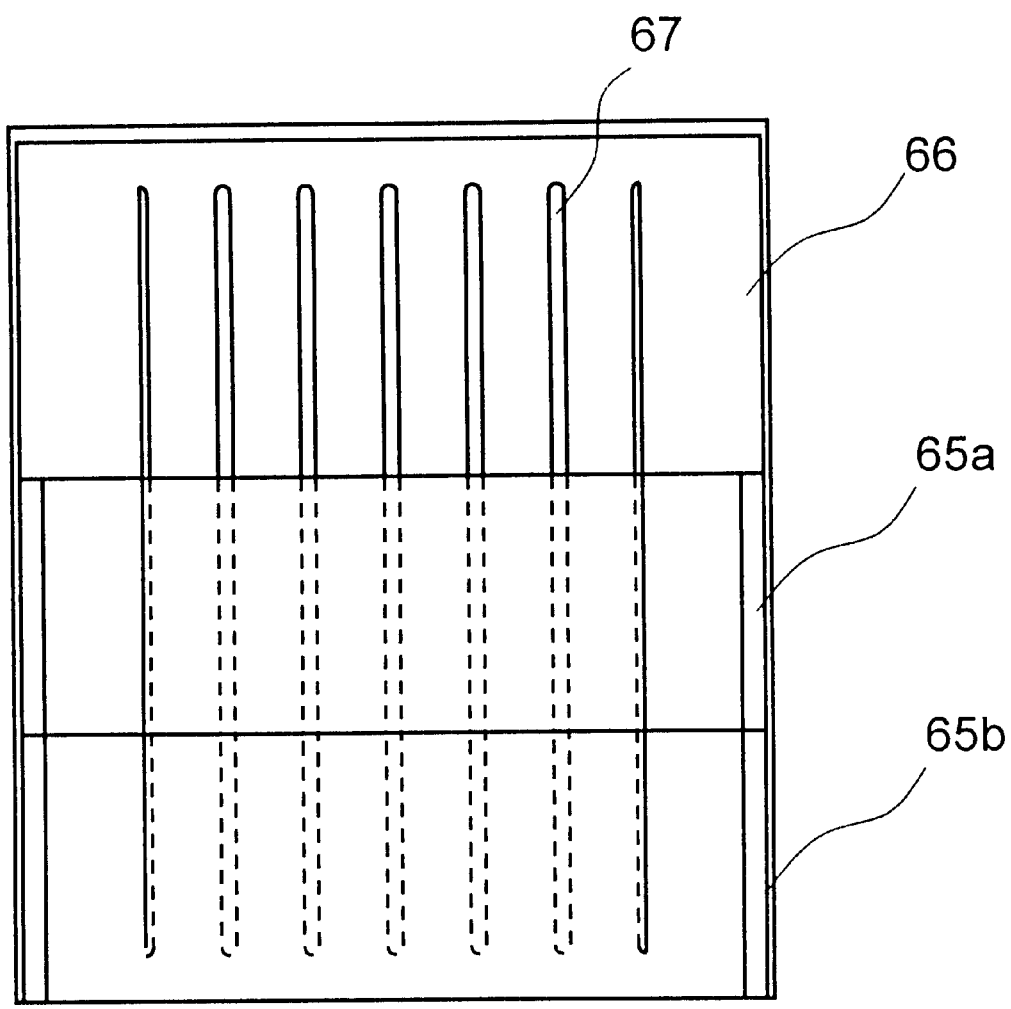
FIG. 9 is a cross section of a vibrator in accordance with the fifth embodiment.

Linear motor 61 shown in FIG. 8 comprises the following elements:

(a) tubular inner yoke 63 having coils 62 where wires are wound;

(b) outer yoke 64 inside which inner yoke 63 is placed;

(c) ring-shaped permanent magnets 65a, 65b vibrating within a space between inner yoke 63 and outer yoke 64 following the magnetic fluxes produced by coils 62; and (d) vibrator 66 supporting magnets 65a, 65b and is made of magnetic material.

Ring-shaped permanent magnets 65a, 65b are fixedly bonded or press-fitted on the inner wall of vibrator 66. The magnetic fluxes of magnets 65a, 65b are directed in radial direction of inner yoke 63, and adjacent magnets 65 have unlike polarities. Magnetic flux of magnet 65a travels from inner yoke 63 to outer yoke 64 while that of magnet 65b travels from outer yoke 64 to inner yoke 63.

This structure allows the linear motor to vibrate vibrator 66 by switching the current at coils 62. When current runs through coils 62, magnetic loops are formed between outer yoke 64 and inner yoke 63. This magnetic loops cause magnetic fluxes to appear in the space between the inner yoke and outer yoke, and permanent magnet 65 approaches this magnetic flux. Then switching the current reverses the magnetic fluxes traveling through the space, and magnet 65 moves in accordance with the magnetic fluxes. As such, vibrator 66 is vibrated by switching the current direction.

The feature of this fifth embodiment is that long and narrow slits 67 are provided in the vibrating direction. Vibrator 66 vibrates crossing the magnetic fluxes, therefore, eddy current tends to appear in the circumferential direction of tubular vibrator 66. Slits 67 are thus provided in the vibrating direction of vibrator 66 so that the production of eddy current in the circumferential direction can be restrained.

Figure 10:
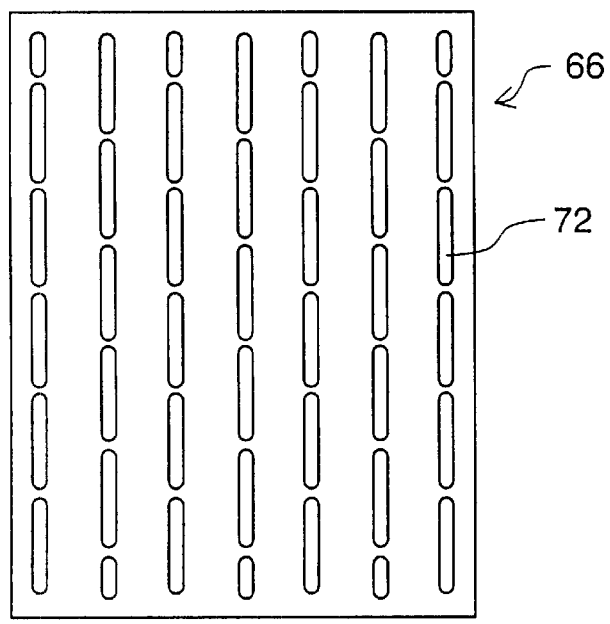
FIG. 10 is a cross section of another vibrator in accordance with the fifth embodiment.
Figure 11:
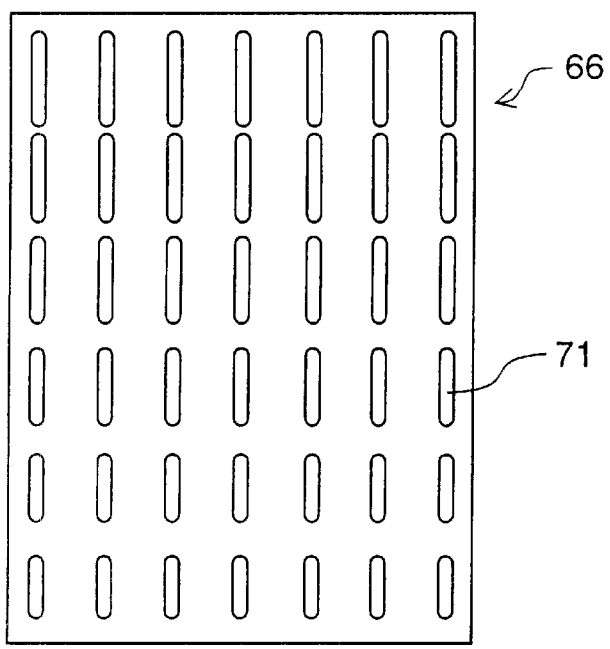
FIG. 11 is a cross section of still another vibrator in accordance with the fifth embodiment.

The shape of the slits may be checked pattern 71 or zigzag pattern 72 as shown in FIGS. 10 and 11 in order to reinforce the strength of vibrator 66.

Figure 12:
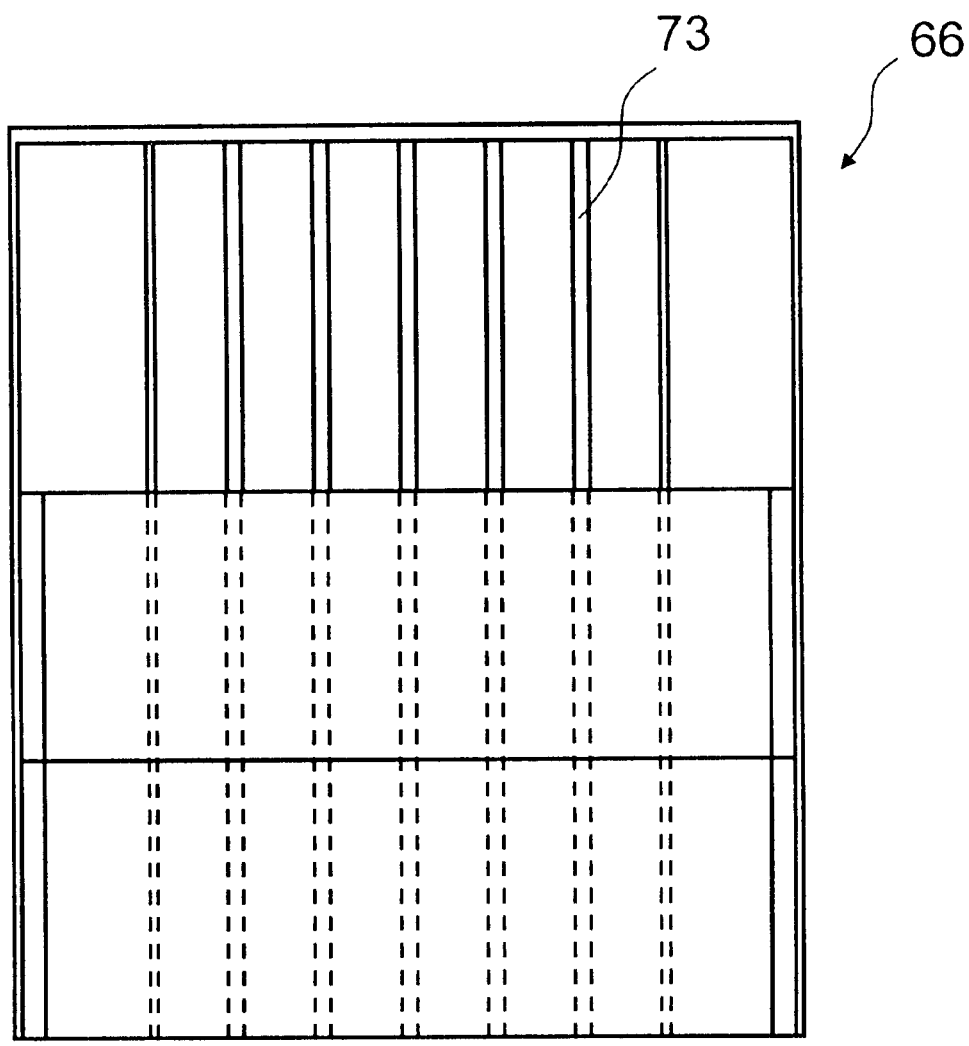
FIG. 12 is a cross section of still further another vibrator in accordance with the fifth embodiment.

Instead of the slits, long and narrow electrical insulating sections 73 made of resin may be provided along the vibrating direction of the vibrator as shown in FIG. 12. Vibrator 66 shown in FIG. 12 is formed by arranging a plurality of rectangular magnetic plates in an annular shape and respective plates are bonded with resin material.

(Exemplary Embodiment 6)

Figure 13A:
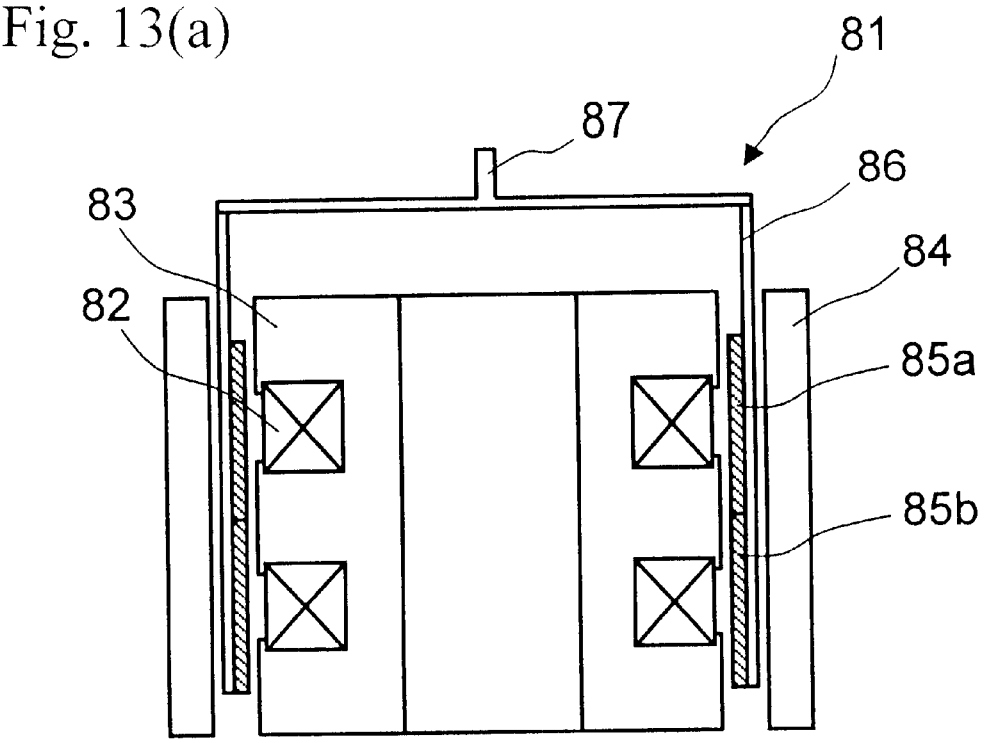
FIG. 13(a) and FIG. 13(b) are a cross section and a plan view of a linear motor in accordance with a sixth exemplary embodiment.
Figure 13B:
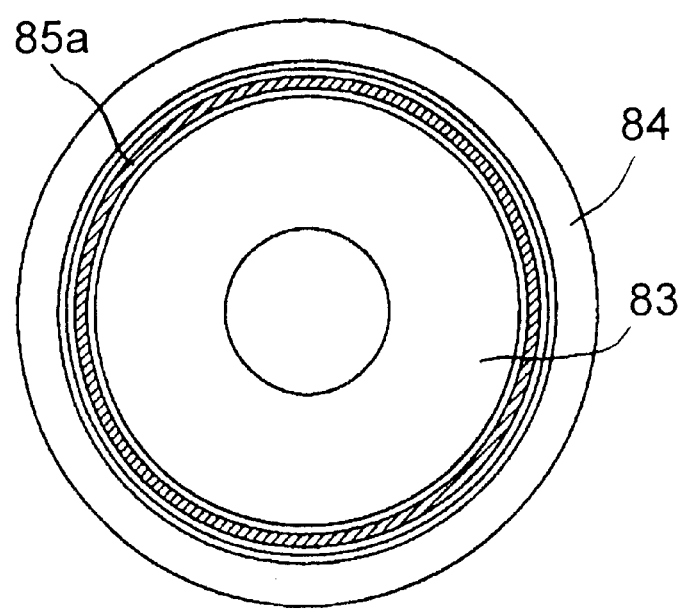

Linear motor 81 shown in FIG. 13 comprises the following elements:

(a) tubular inner yoke 83 having coils 82 where wires are wound;

(b) outer yoke 84 inside which inner yoke 83 is placed;

(c) permanent magnets 85a, 85b vibrating within a space between inner yoke 83 and outer yoke 84 following the magnetic fluxes produced by coils 82; and (d) tubular vibrator 86 supporting magnets 85a, 85b and being made of magnetic material.

Permanent magnets 85a, 85b are fixed to vibrator 86 on its inner yoke 83 side. On one end of vibrator 86, there is output section 87 for taking out vibration of vibrator 86. Output section 87 shapes in as if it closes tubular vibrator 86.

Inner yoke 83 and outer yoke 84, features of this sixth embodiment, are made by compressing and molding the mixture of metal magnetic particles and electrically insulating resin. The adjacent metal magnetic particles in this compressed and molded body are electrically insulated by the insulating resin, therefore, the production of eddy current loss can be restrained without laminating electromagnetic steel sheets in circumferential direction. The yokes thus can eliminate the laminate.

Figure 14:
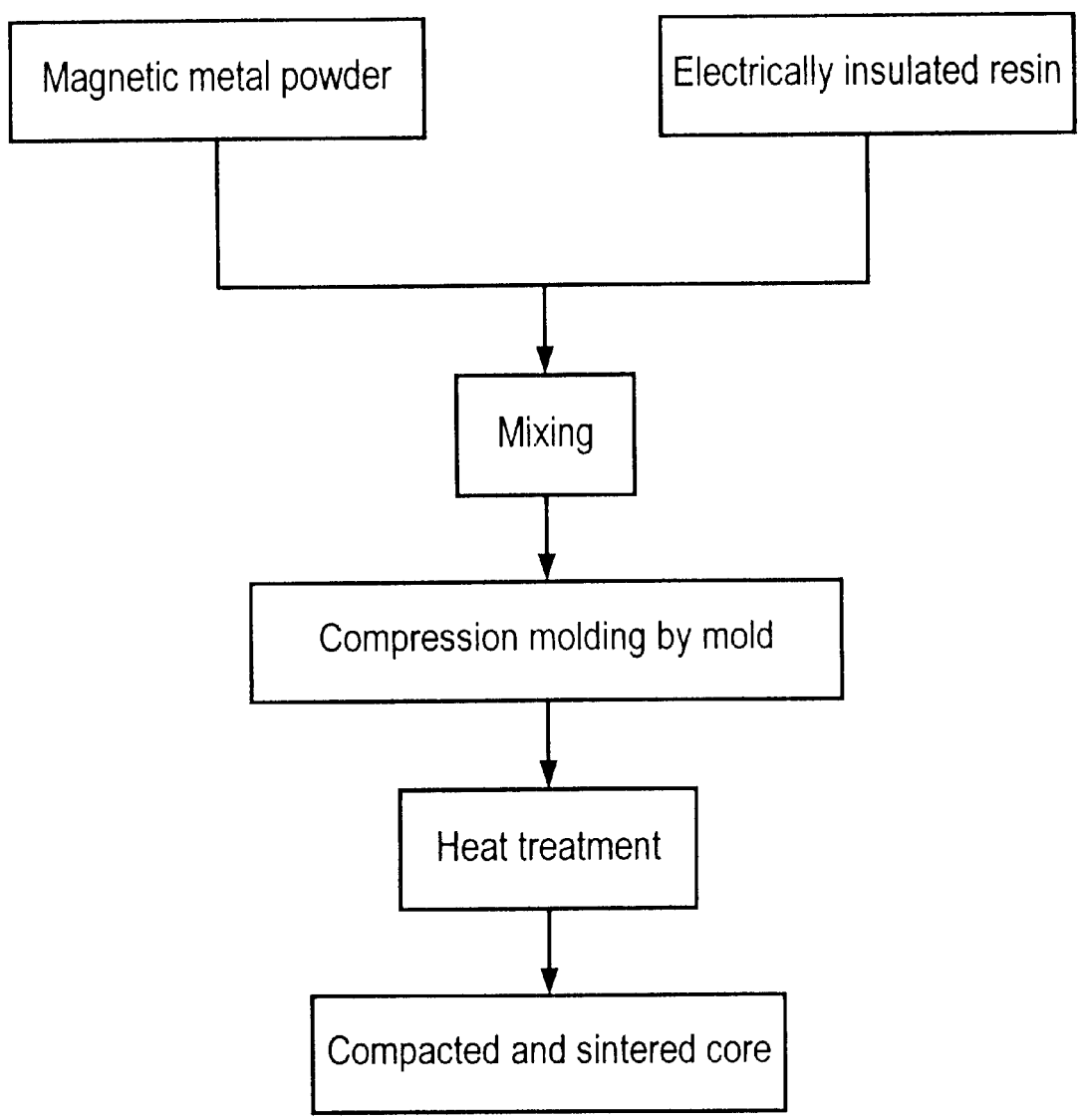
FIG. 14 is a flowchart illustrating a manufacturing process of a compressed and molded body in accordance with the sixth embodiment.

Next, a manufacturing method of inner yoke 83 and outer yoke 84 is described hereinafter with reference to FIG. 14.

The metal magnetic particles used for sintered cores for the linear motor comprises mainly iron; however, it is not limited to iron, and it may comprise an alloy of iron and silicon, or iron and aluminum, iron and nickel, iron and cobalt alloy, nickel and iron, or an alloy of nickel and iron including chrome, aluminum, and titanium. The material may be a mixture of these alloys.

One of these metal magnetic particles and electrically insulating resin, e.g. epoxy resin, nylon resin, polymide resin, polyamide resin, polyester resin, are mixed.

The metal magnetic particles mixed with the insulating resin is charged into a mold of the desired core for the linear motor, and compression molding not more than 1000 MPa is carried out to produce a shape of core. After this, thermal process not more than 300° C. is carried out for hardening the resin.

As such, the yoke of the linear motor can be unitarily manufactured. A yoke of a conventional linear motor has been produced by laminating a plurality of electromagnetic steel sheets in circumference direction, therefore, it is difficult to manufacture this yoke from the mechanical standpoint. This new manufacturing method eliminates the laminate of electromagnetic steel sheets, and yet obtains the same advantage, i.e. restraining the production of eddy current, as the laminated yoke.

Another factor of restraining the production of eddy current is that the adjacent metal-magnetic-particles are electrically insulated. The electrically insulating resin functions also as a binder for fusion-splicing the metal magnetic particles.

Figure 15:
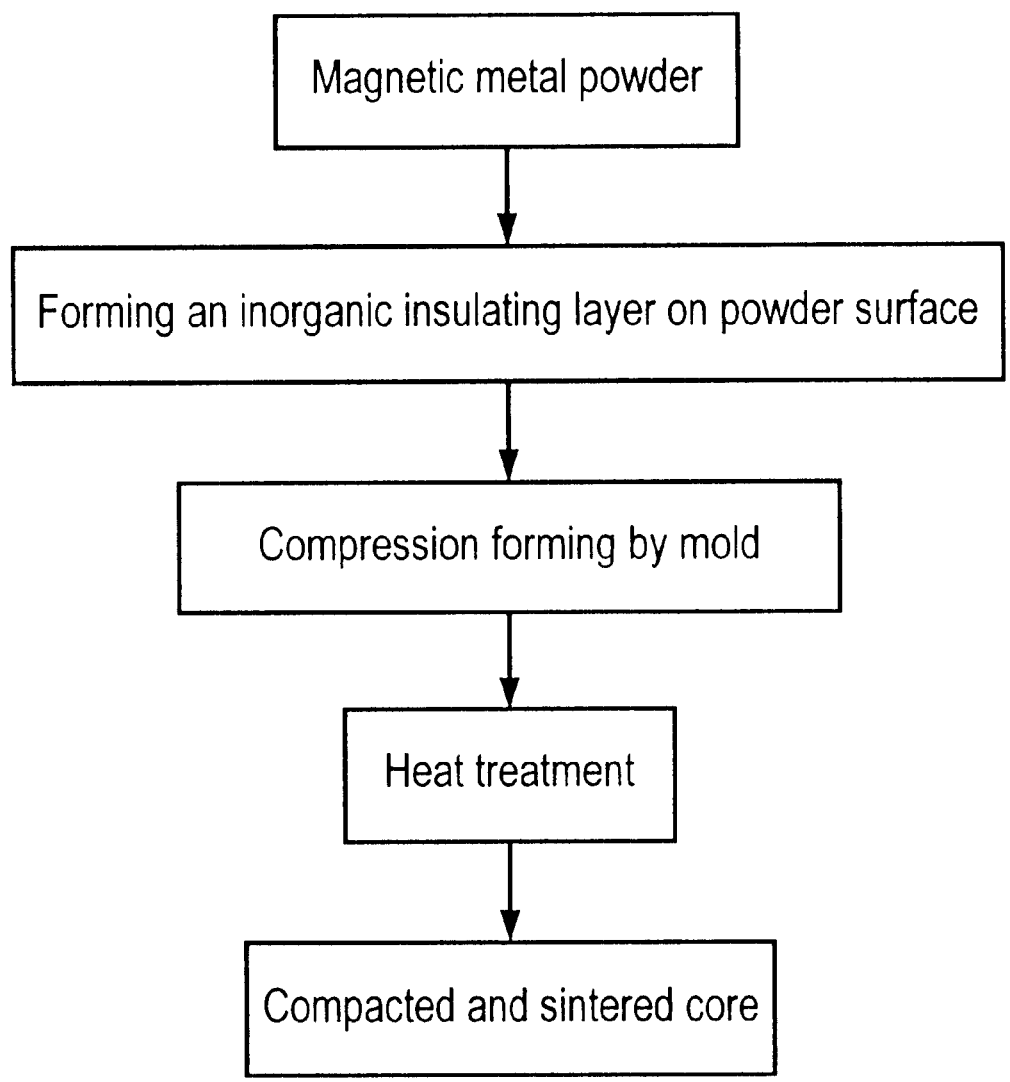
FIG. 15 is a flowchart illustrating a manufacturing process of a compression-formed body in accordance with the sixth embodiment.

The manufacturing method of the compressed and molded body, i.e. compressing the particles and resin to be molded, is discussed above; however, as shown in FIG. 15, metal magnetic particles on which surface an electrically insulating layer is disposed can be compression-formed.

The metal magnetic particles used for sintered cores for the linear motor comprises mainly iron; however, it is not limited to iron, and it may comprise an alloy of iron and silicon, or iron and aluminum, iron and nickel, iron and cobalt alloy. The material may be a mixture of these alloys. An electrically insulating layer made of e.g. inorganic material such as phosphate is formed on the surface of these particles. This layer insulates the adjacent metal magnetic particles, so that the production of eddy current is restrained.

The metal magnetic particles having electrical insulation on their surfaces are charged in a mold, and compression forming not more than 1000 MPa is carried out to produce a shape of core. After this, thermal process at 350–800° C. is carried out for improving magnetic characteristics such as lowering hysteresis loss.

(Exemplary Embodiment 7)

Figure 16A:
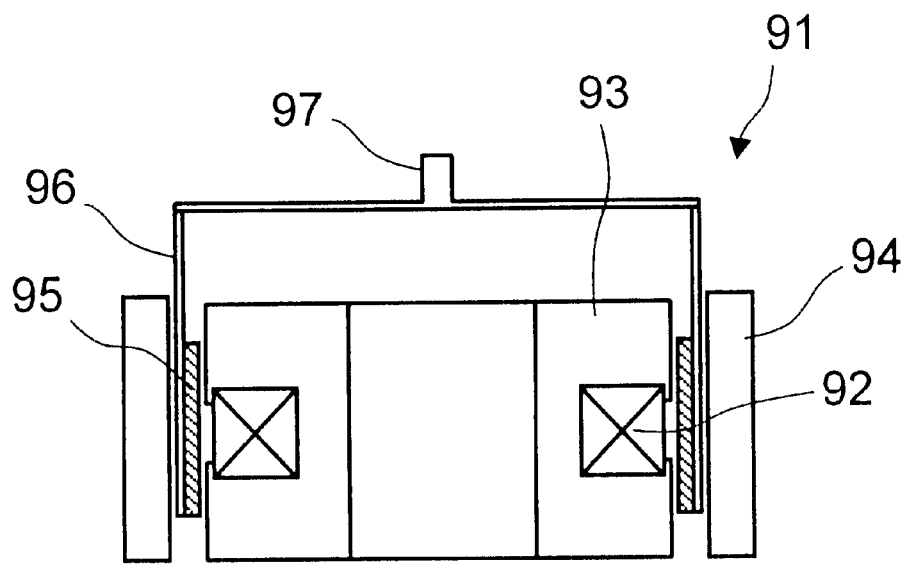
FIG. 16(a) and FIG. 16(b) are a cross section and a plan view of a linear motor in accordance with a seventh exemplary embodiment.
Figure 16B:
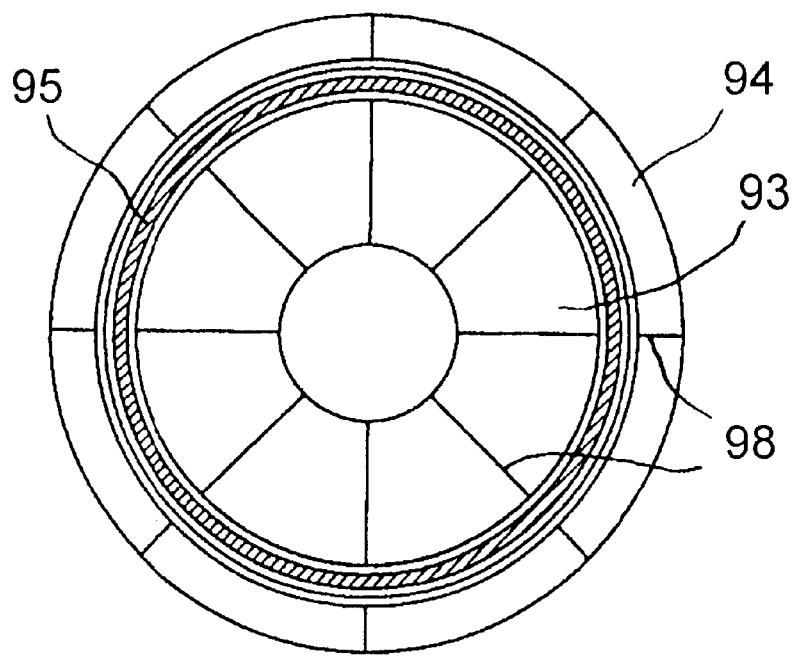

Linear motor 91 shown in FIG. 16 comprises the following elements:

(a) tubular inner yoke 93 having coil 92 where wires are wound;

(b) outer yoke 94 inside which inner yoke 93 is placed;

(c) permanent magnets 95 vibrating within a space between inner yoke 93 and outer yoke 94 following the magnetic fluxes produced by coil 92; and (d) tubular vibrator 96 supporting magnets 95 and is made of magnetic material.

Permanent magnets 95 is fixed to vibrator 96 on its inner yoke 93 side. On one end of vibrator 96, there is output section 97 for taking out vibration of vibrator 96. Output section 97 shapes in as if it closes tubular vibrator 96.

Inner yoke 93 and outer yoke 94 are made by compressing and molding the mixture of metal magnetic particles and electrically insulating resin.

The features of this seventh embodiment are that inner yoke 93 and outer yoke 94 are compressed and molded bodies, and they are divided into a plurality of blocks in the circumference direction, and insulating layers 98 are provided to the divided bonding faces of the yoke.

As such, the yoke is divided into pieces, they can be manufactured with smaller molds, and thus the manufacturing cost can be lowered. Further, if the yoke is divided in the circumferential direction, and insulating layers 98 are provided on bonding faces, the production of eddy current is further lowered.

(Exemplary Embodiment 8)

Figure 17A:
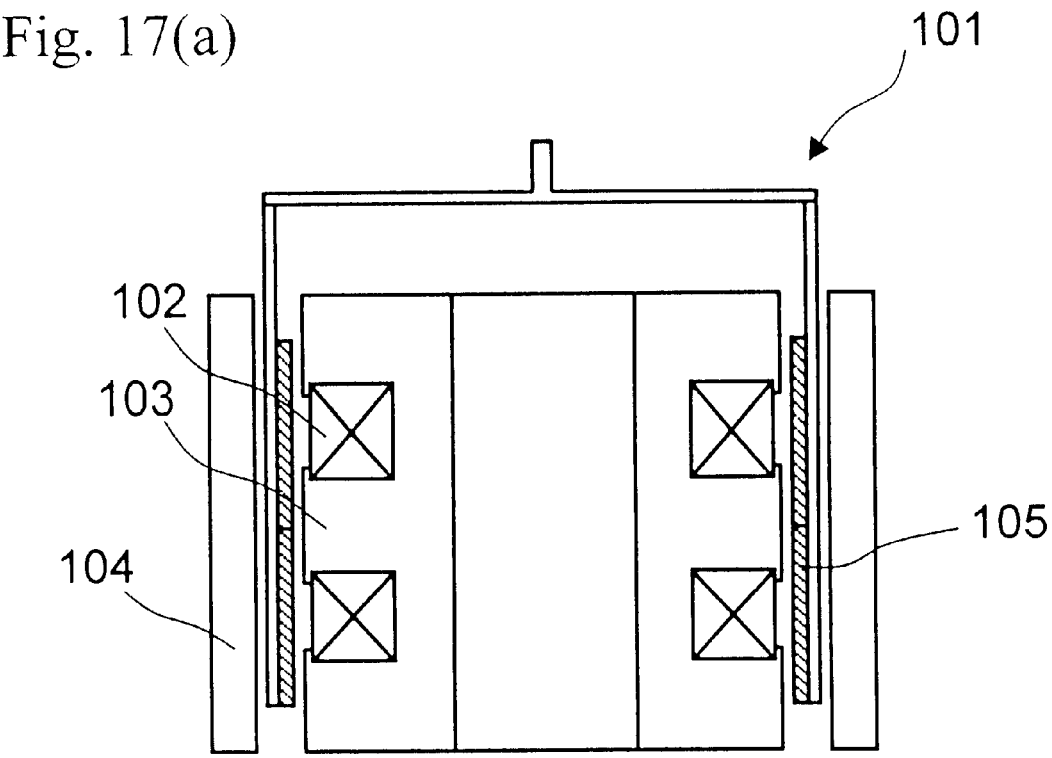
FIG. 17(a) and FIG. 17(b) are a cross section and a plan view of a linear motor in accordance with an eighth exemplary embodiment.
Figure 17B:
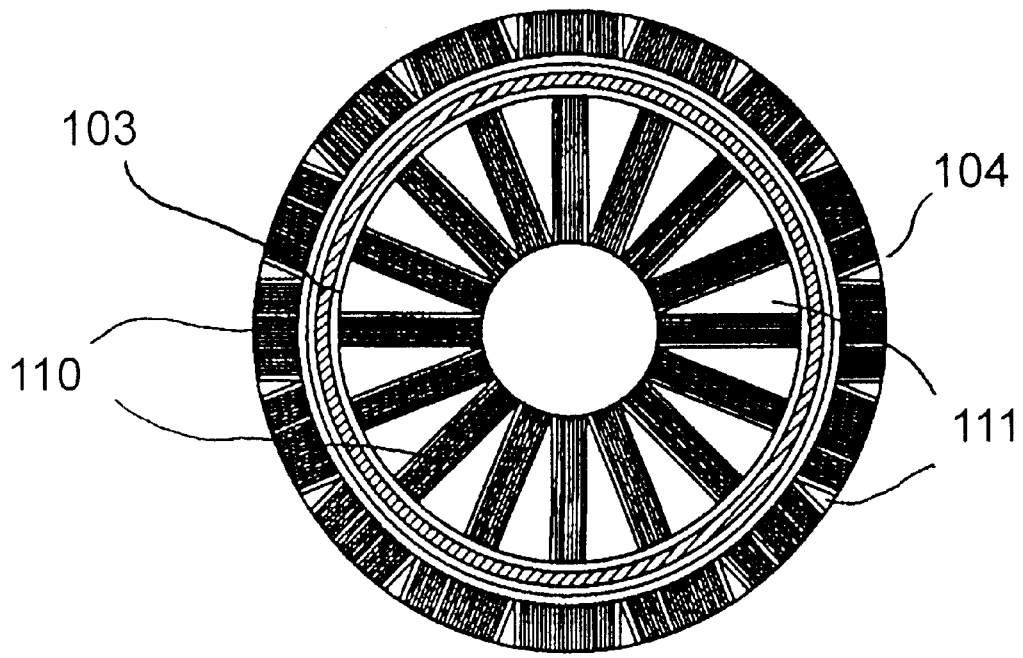

Linear motor 101 shown in FIG. 17 comprises the following elements:

(a) tubular inner yoke 103 having coils 102 where wires are wound;

(b) outer yoke 104 inside which inner yoke 103 is placed;

(c) permanent magnets 105 vibrating within a space between inner yoke 103 and outer yoke 104 following the magnetic fluxes produced by coils 102; and (d) tubular vibrator 106 supporting magnets 105 and is made of magnetic material.

A feature of this eighth embodiment is that inside yoke 103 and outer yoke 104, both are compressed and molded bodies, are formed by combining multi-layered blocks 110 made by laminating electromagnetic steel sheets with compressed and molded body 111 made by compressing and molding the metal magnetic particles and an electrical insulating resin.

As shown in FIG. 17, multi-layered blocks 110 are arranged in circumference shape, and compressed and molded bodies 111 fit into gaps between the adjacent blocks are combined with blocks 110, thereby obtaining inner yoke 103 and outer yoke 104.

Further, a number of multi-layered blocks is increased, and compressed and molded bodies 111 are disposed therebetween. One plate of electromagnetic steel may be treated as a multi-layered block, and compressed and molded bodies are disposed between the adjacent plates. This structure is still within the scope of the present invention.

Industrial Applicability

A vibrator is made of magnetic material, so that a space is shortened. As a result, a highly efficient linear motor is provided.

Further, a permanent magnet is fixed to the vibrator on its coil side, thereby shortening the space between a yoke on a coil-side and the permanent magnet.

Still further, a yoke can be manufactured with ease.

What is claimed is:

1. A linear motor comprising:

(a) a tubular outer yoke;

(b) a tubular inner yoke disposed in said outer yoke;

(c) a coil provided to one of said outer yoke and said inner yoke;

(d) a permanent magnet located between said outer yoke and said inner yoke and that vibrates in response to a magnetic flux produced by said coil; and (e) a vibrator supporting said permanent magnet, wherein at least one of said outer yoke and said inner yoke is formed by arranging a plurality of multi-layered blocks in an annular shape, with a spacing between adjacent blocks thereof filled with a compression-formed body.

2. A compressor including a linear motor, said motor comprising:

(a) a tubular outer yoke;

(b) a tubular inner yoke disposed in said outer yoke;

(c) a coil provided to one of said outer yoke and said inner yoke;

(d) a permanent magnet located between said outer yoke and said inner yoke and that vibrates in response to a magnetic flux produced by said coil; and (e) a vibrator supporting said permanent magnet, wherein at least one of said outer yoke and said inner yoke is formed by arranging a plurality of multi-layered blocks in an annular shape, with a spacing between adjacent blocks thereof filled with a compression-formed body.

* * * * *